(12) United States Patent
Yew Lam et al.

(10) Patent No.: US 10,840,701 B2
(45) Date of Patent: Nov. 17, 2020

(54) INSTRUMENTATION CHASSIS WITH SINGLE OUTPUT AC TO DC POWER SUPPLY AND DC TO DC SWITCHING REGULATORS

(71) Applicant: Keysight Technologies, Inc., Santa Rosa, CA (US)

(72) Inventors: Kuen Yew Lam Yew Lam, Selangor (MY); Thiam Ping Oon, Penang (MY); Jarrett Gardner, Santa Rosa, CA (US); Chris R. Jacobsen, Fort Collins, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 54 days.

(21) Appl. No.: 15/996,104

(22) Filed: Jun. 1, 2018

(65) Prior Publication Data

US 2019/0372344 A1 Dec. 5, 2019

(51) Int. Cl.
*H02J 1/10* (2006.01)
*H02M 1/14* (2006.01)
*G06F 13/42* (2006.01)

(52) U.S. Cl.
CPC .......... *H02J 1/102* (2013.01); *G06F 13/4221* (2013.01); *H02M 1/14* (2013.01)

(58) Field of Classification Search
CPC ........ H02J 1/102; G06F 13/4221; H02M 1/14
See application file for complete search history.

(56) References Cited

U.S. PATENT DOCUMENTS

| | | | |
|---|---|---|---|
| 5,945,746 A | * | 8/1999 | Tracewell .......... H05K 7/20572 165/104.33 |
| 6,317,012 B1 | | 11/2001 | Coffey |
| 6,317,345 B1 | | 11/2001 | Hayward et al. |
| 6,421,259 B1 | | 7/2002 | Brooks et al. |
| 7,730,332 B1 | * | 6/2010 | Templeton .............. H02J 1/102 713/300 |

(Continued)

FOREIGN PATENT DOCUMENTS

CN 102593784 B 12/2014

OTHER PUBLICATIONS

English Translation of CN102593784 dated Dec. 12, 2014.

*Primary Examiner* — Eric T Oberly (57) ABSTRACT

A modular instrumentation chassis includes a backplane PCB; multiple slots located on the backplane PCB and configured to receive multiple insertable modules, respectively; an AC-DC power supply configured to generate an isolated DC output voltage; and multiple DC-DC switching regulator units corresponding to the multiple of slots, respectively, each DC-DC switching regulator unit separately receiving the isolated DC output voltage from the AC-DC power supply. Each DC-DC switching regulator unit includes at least one DC-DC switching regulator configured to convert the received isolated DC output voltage to at least one different DC voltage, respectively, available to the slot of the multiple slots corresponding to the DC-DC switching regulator unit. A switching frequency of the at least one DC-DC switching regulator in each DC-DC switching regulator unit is separately adjustable to provide the at least one different DC voltage.

18 Claims, 3 Drawing Sheets

(56) References Cited

U.S. PATENT DOCUMENTS

| | | | |
|---|---|---|---|
| 2004/0225821 A1* | 11/2004 | Klein | G06F 15/0216 |
| | | | 710/306 |
| 2004/0228087 A1* | 11/2004 | Coglitore | G06F 1/189 |
| | | | 361/679.46 |
| 2005/0239518 A1* | 10/2005 | D'Agostino | G06F 1/3203 |
| | | | 455/574 |
| 2007/0139975 A1* | 6/2007 | Yamauchi | H02M 3/33584 |
| | | | 363/16 |
| 2008/0052551 A1* | 2/2008 | Chapuis | G06F 1/26 |
| | | | 713/340 |
| 2009/0021078 A1* | 1/2009 | Corhodzic | G06F 1/263 |
| | | | 307/67 |
| 2015/0285843 A1* | 10/2015 | Michal | H02M 3/156 |
| | | | 324/713 |
| 2016/0234978 A1* | 8/2016 | Lam | G01R 1/04 |
| 2017/0039125 A1* | 2/2017 | Oliverio | G06F 9/52 |
| 2019/0115986 A1* | 4/2019 | Goller | H04B 15/04 |
| 2019/0273436 A1* | 9/2019 | Tang | H02M 1/08 |

* cited by examiner

INSTRUMENTATION CHASSIS WITH SINGLE OUTPUT AC TO DC POWER SUPPLY AND DC TO DC SWITCHING REGULATORS

BACKGROUND

Peripheral component interconnect (PCI) and the more recent peripheral component interconnect express (PCIe) are standards for incorporating peripheral devices into computing systems. PCI and PCIe define physical and logical interfaces and protocols for communication with PCI and PCIe compatible devices. For example, PCIe may be used in consumer and industrial applications as a motherboard level interconnect, a passive backplane interconnect, and an expansion card interface. Various standards are based on PCI and PCIe, such as PCI eXtensions for instrumentation (PXI) and PCIe eXtensions for instrumentation (PXIe), which adapt PCI and PCIe, respectively, for test and measurement applications.

Figure 1:
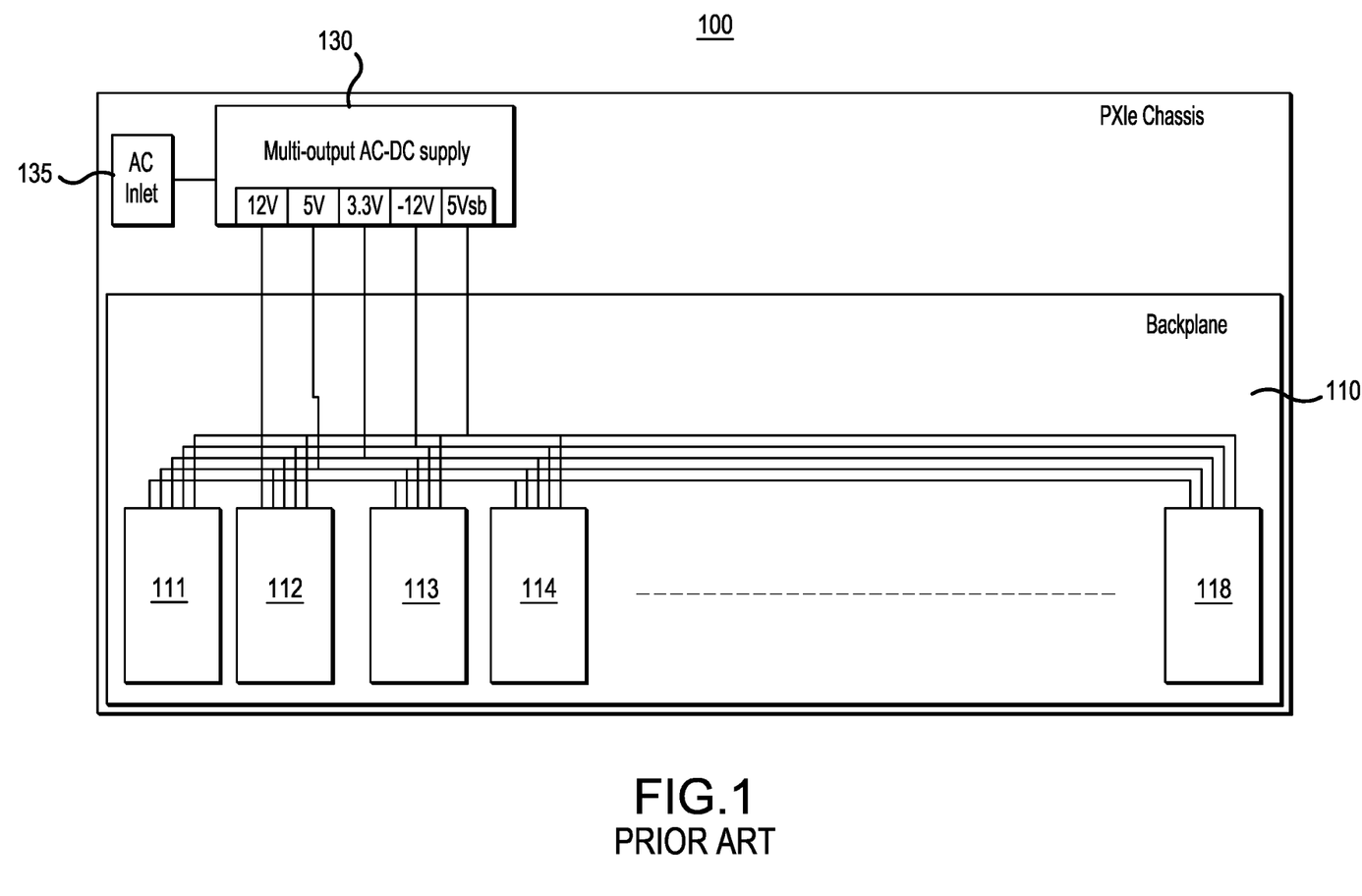
FIG. 1 is a simplified block diagram of a conventional instrumentation chassis, including a single AC-DC power supply that provides DC voltages to each slot.

PXIe compatible devices may be configured as peripheral modules and interconnected with one another and/or with a system controller through a network of switches (switch fabric) in a modular instrumentation framework (chassis). For example, the system controller may be connected to a root complex having PCIe ports, each of which is connected to a peripheral device or a switch. Each switch is connected to multiple PXIe slots in the chassis, which are configured to receive the peripheral modules. The instrumentation chassis may also include other types of modules, such as a system module for controlling operations of the other modules, and a timing module for providing timing signals to the other modules. The flexible nature of the switch fabric enables customization of an individual system. Each of the PXIe slots and corresponding modules require application of DC power for operation, which requires implementation of an AC-DC power converter. FIG. 1 is a simplified block diagram showing power architecture of a conventional, modular PXIe chassis, including a single AC-DC power supply that provides various DC voltages to each of the slots.

More particularly, referring to FIG. 1, conventional PXIe chassis 100 includes a backplane printed circuit board (PCB) 110 and multiple slots, indicated by representative slots 111, 112, 113, 114, . . . 118, located on the backplane PCB 110. The slots 111-118 are configured to receive various modules (e.g., PXIe modules). The PXIe chassis 100 also includes a multi-output AC to DC (AC-DC) power supply 130 (or AC-DC power converter) connected to an AC power inlet 135. The AC-DC power supply 130 provides multiple DC outputs used to supply all the power rails required for all of the slots 111-118. For example, the AC-DC power supply 130 may be configured to provide 12V, 5V, 3.3V, −12V and 5Vsb (standby). The power rails are shared across all of the slots 111-118 through copper plane layers, for example, on the backplane PCB 110, thereby providing little to no noise isolation between slots and modules (not shown) that may be inserted within the slots 111-118. The AC-DC power supply 130 is typically customized to meet the voltage, current and noise requirements of the PXIe specifications, and is not easily interchangeable.

The conventional PXIe chassis 100 has a number of drawbacks. For example, a multi-output AC-DC power supply, such as the AC-DC power supply 130, is more complex than a single output AC-DC power supply, and typically needs to be customized to meet PXIe requirements. Such customization increases cost, and to an extent, affects reliability. Also, the customization generally requires a user commit to one supplier. While AC-DC power supplies exist that can meet basic PXIe noise requirements, they are still too noisy for high-end radio frequency (RF) test and measurement systems, therefore requiring additional filtering in the backplane PCB 110 and/or one or more modules inserted into the slots 111-118. In addition, noise conducted from one module can easily impact other modules in the chassis 100 since the power rails are shared. This results in undesired spurious noise in RF measurements that are difficult to remove.

Accordingly, there is a need for a low noise power architecture that is compatible with PXIe and other specifications, as well as high-end RF test and measurement systems, and may be flexibly controlled.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings. Generally, it is understood that the drawings and the various elements depicted therein are not drawn to scale.

Generally, it is understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable. As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Figure 2:
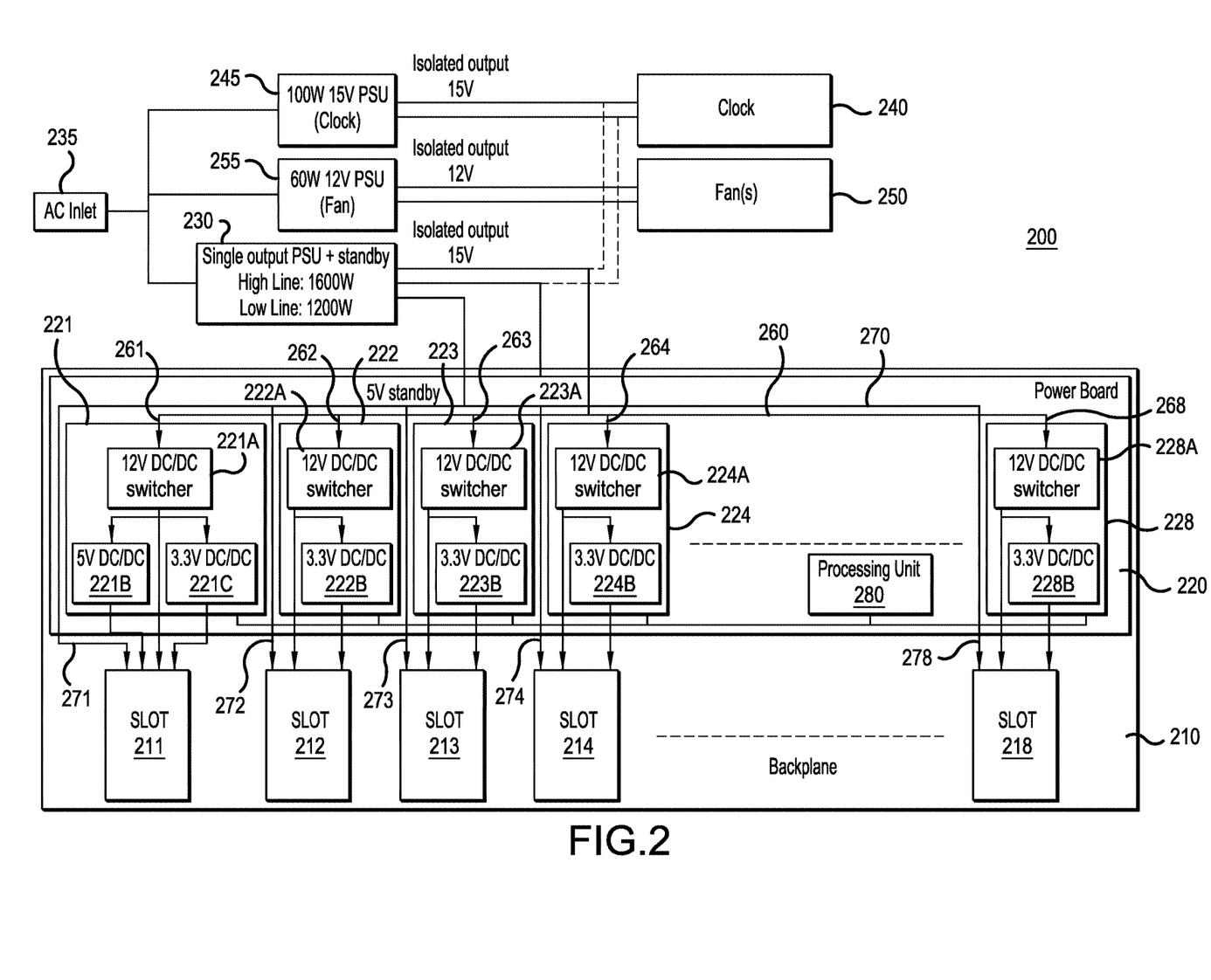
FIG. 2 is a simplified block diagram of an instrumentation chassis, including multiple DC-DC power supplies that provide DC voltages to slots, respectively, according to a representative embodiment.

FIG. 2 is a simplified block diagram of an instrumentation chassis, including multiple DC-DC power supplies that provide DC voltages to slots, respectively, according to a representative embodiment.

Referring to FIG. 2, illustrative instrumentation chassis 200 is shown as an 18-slot, PXIe chassis, for example, although various numbers of slots (e.g., 10-slots) and/or various alternative types of chassis (e.g., a hybrid PXI/PXIe chassis or an Advanced Telecommunications Computing Architecture (ATCA) eXtensions for instrumentation (AXIe) chassis), may be incorporated without departing from the scope of the present teachings. In the depicted embodiment, the instrumentation chassis 200 includes a backplane PCB 210, a power board 220, and a low noise, single output AC-DC power supply 230 connected to an AC power inlet 235. The single output AC-DC power supply 230 may also be referred to as an AC-DC power converter or an AC-DC power supply unit (PSU). Generally, a single output AC-DC power supply is less complex than a multi-output AC-DC power supply, such as multi-output AC-DC power supply 130, with less stringent demands on noise performance and requiring little to no customization. As mentioned above, the multi-output AC-DC power supply 130, in comparison, would typically need to be customized to meet PXIe requirements. The single output AC-DC power supply therefore decreases cost, and to an extent, enhances reliability.

The single output of the single output AC-DC power supply 230 refers to an output voltage used ultimately to provide operational power at one or more voltages to slots 211, 212, 213, 214, . . . 218 (and corresponding modules), discussed below, e.g., through DC-DC conversion, enabling the modules to perform corresponding functions. In comparison, in the depicted embodiment, the single output AC-DC power supply 230 also provides a low power 5V standby signal (5 Vsb), but the 5V standby signal is a very low current output that is used by the chassis 200 and slots 211, 212, 213, 214, . . . 218 (and corresponding modules) only to supply auxiliary circuitries that stay powered on when the chassis 200 is in the standby mode (not in operation), where AC power is plugged in but the main DC output is turned off. Due to its auxiliary nature, the 5V standby signal is not considered an "output" of the single output AC-DC power supply 230, herein.

The slots in the chassis 200 are indicated by representative slots 211, 212, 213, 214, . . . 218, and are located on the backplane PCB 210. The backplane PCB 210 generally provides a switch fabric for selectively interconnecting the modules inserted into corresponding slots 211, 212, 213, 214, . . . 218. In the depicted embodiment, the slot 211 is a system slot configured to receive a system module (not shown), which may include an internal PXIe system controller, or a controller interface for interfacing with an external PXIe system controller, to control operations of the other modules inserted in other slots. The slots 212, 213, 214, . . . 218 may be peripheral slots configured to receive any of various types of peripheral modules (not shown) for providing customized functionality of the chassis 200. Examples of peripheral modules include arbitrary waveform generator modules, digital multi-meter (DMM) modules, oscilloscope modules, multiplexer modules, switch modules, accelerator modules, signal generator modules, and the like. Of course, various numbers and types of slots may be incorporated without departing from the scope of the present teachings. For example, one of the slots 212, 213, 214, . . . 218 may be a timing slot for receiving a timing module. The various modules insertable into the slots 212, 213, 214, . . . 218 may have front panels (not shown), respectively, that may include various controls (e.g., power switch, rheostat) to enable operational control of circuitry within the modules, as well as exposed connectors (e.g., coaxial cable connectors) to enable direct connectivity to front panels of other modules within the chassis 200 and/or to external devices.

The chassis 200 also includes multiple DC to DC (DC-DC) switching regulator units arranged on the power board 220, indicated by representative DC-DC switching regulator units 221, 222, 223, 224, . . . 228, corresponding to the slots 211, 212, 213, 214, . . . 218, respectively. Each of the DC-DC switching regulator units 221, 222, 223, 224, . . . 228 separately receives isolated DC output voltage from the AC-DC power supply 230, and converts the received isolated DC output voltage to one or more converted DC voltages, which are provided to the slots 211, 212, 213, 214, . . . 218, respectively, and the corresponding inserted modules. Accordingly, power is provided to each of the slots 211, 212, 213, 214, . . . 218 at the slot level, enabling individual control of such factors as switching frequency, phase angle and dither for achieving low noise, for example, by a processing unit 280, discussed below. Also, DC-DC switching regulator units 221, 222, 223, 224, . . . 228 corresponding to unused slots 211, 212, 213, 214, . . . 218 may be powered down to minimize noise. Generally, the depicted arrangement of the DC-DC switching regulator units 221, 222, 223, 224, . . . 228 spreads power dissipation across a wider area of the backplane PCB 210, resulting in reduced power density, e.g., as compared to use of a multi-multi-output AC-DC power supply with no DC-DC switching regulator units servicing individual slots. Also, the depicted arrangement increases noise isolation between the slots 211, 212, 213, 214, . . . 218.

Each of the DC-DC switching regulator units 221, 222, 223, 224, . . . 228 is a circuit that includes at least one DC-DC switching regulators, for example, configured to respectively supply different converted DC voltages to modules inserted in the corresponding slots 211, 212, 213, 214, . . . 218. The DC voltage output provided by a DC-DC switching regulator is determined, at least in part, by a switching frequency, as is known in the art. This switching frequency directly affects the amount of noise and the frequency of the noise on the DC voltage outputs of the DC-DC switching regulators. Therefore, adjustments to the switching frequency (e.g., by dithering, controlling phase with respect to another DC-DC switching regulator, and the like) enables the noise levels to be controlled and/or minimized, e.g., by the processing unit 280.

In the example shown in FIG. 2, the DC-DC switching regulator unit 221 includes switching regulators 221A, 221B and 221C; the DC-DC switching regulator unit 222 includes DC-DC switching regulators 222A and 222B; the DC-DC switching regulator unit 223 includes DC-DC switching regulators 223A and 223B; the DC-DC switching regulator unit 224 includes DC-DC switching regulators 224A and 224B; and the DC-DC switching regulator unit 228 includes DC-DC switching regulators 228A and 228B. The DC-DC switching regulator unit 221 corresponds to a system slot and module, and the DC-DC switching regulator units 222, 223, 224, . . . 228 correspond to peripheral slots and modules, as discussed below. Of course, the number and type of DC-DC switching regulators included in the DC-DC switching regulator unit 221 and/or the DC-DC switching regulator units 221, 222, 223, 224, . . . 228 may vary to provide unique benefits for any particular situation or to meet application specific design requirements of various implementations, as would be apparent to one skilled in the art, without departing from the scope of the present teachings.

Referring to FIG. 2, the AC-DC power supply 230 may have a high line output capacity of 1600 W and a low line output capacity of 1200 W, such that the AC-DC power supply 230 is able to deliver 1600 W of power at a single 15V DC output when supplied from a 230V AC supply, or 1200 W of power at a single 15V DC output when supplied from a 110V AC supply, for example. The 15V output is input to each of the DC-DC switching regulator units 221, 222, 223, 224, . . . 228 via a common rail 260 and dedicated rails 261, 262, 263, 264, . . . 268, respectively. In the depicted embodiment, each of the DC-DC switching regulator units 222, 223, 224, . . . 228 converts the 15V input to 12V DC using a 12V (e.g., 6 A current) DC-DC switching regulator (e.g., DC-DC switching regulators 222A, 223A, 224A, . . . 228A) and to 3.3V DC using a 3.3V (e.g., 6 A current) DC-DC switching regulator (e.g., DC-DC switching regulators 222B, 223B, 224B, . . . 228B). The 12V and 3.3V are input to the corresponding slots 212, 213, 214, . . . 218, respectively, to provide power to the insertable peripheral modules (not shown). For example, each of the DC-DC switching regulators may be implemented as a LT8643S or a LT8645S low noise Silent Switcher®, available from Analog Devices, Inc., although other types of DC-DC switching regulators may be implemented without departing from the scope of the present teachings.

In the depicted embodiment, the DC-DC switching regulators 222A, 223A, 224A, . . . 228A are configured to receive the isolated 15V DC directly from the AC-DC power supply 230 and to output the 12V DC. Also, the DC-DC switching regulators 222B, 223B, 224B, . . . 228B are configured to receive the 12V DC from the DC-DC switching regulators 222A, 223A, 224A, . . . 228A, respectively, and to output the 3.3V DC. Alternatively, the DC-DC switching regulators 222B, 223B, 224B, . . . 228B may be configured to receive the isolated 15V DC directly from the AC-DC power supply 230 to output the 3.3V DC. Of course, other configurations and/or voltages may be incorporated without departing from the scope of the present teachings.

Also in the depicted embodiment, the slot 211 is configured to receive a system module (as opposed to a peripheral module), and therefore may have different power requirements. In the depicted example, the DC-DC switching regulator unit 221 converts the 15V input to 12V DC using a 12V (e.g., 20 A current) DC-DC switching regulator (e.g., DC-DC switching regulator 211A), and converts the 12V to 5V DC and 3.3V DC using a 5V (e.g., 9 A current) DC-DC switching regulator (e.g., DC-DC switching regulator 211B) and a 3.3V (e.g., 9 A current) DC-DC switching regulator (e.g., DC-DC switching regulator 211C), respectively. The 12V, 5V and 3.3V DC are input to the corresponding slot 211 to provide power to the insertable system module (not shown).

In the depicted embodiment, the DC-DC switching regulator 221A is configured to receive the isolated 15V DC directly from the AC-DC power supply 230 and to output the 12V DC. Also, the DC-DC switching regulators 221B and 221C are configured to receive the 12V DC from the DC-DC switching regulator 221A, and to output the 5V DC and the 3.3V DC, respectively. Alternatively, one or both of the DC-DC switching regulators 221B and 221C may be configured to receive the isolated 15V DC directly from the AC-DC power supply 230 to output the 5V DC and the 3.3 DC, respectively. Of course, other configurations and/or voltages may be incorporated without departing from the scope of the present teachings.

In addition, the AC-DC power supply 230 provides the low power 5V DC standby voltage, as discussed above, which is input directly to the slots 211, 212, 213, 214, . . . 218, bypassing the DC-DC switching regulator units 221, 222, 223, 224, . . . 228. The 5V DC standby voltage is provided to the slots 211, 212, 213, 214, . . . 218 via a common rail 270 and dedicated rails 271, 272, 273, 274, . . . 278, respectively. The purpose of the 5V DC standby voltage is to power auxiliary circuitries on the backplane and modules that remain powered on during chassis standby mode (AC powered on, but DC power turned off), for example, circuitry that detects the power button push to signal DC power turn on. As mentioned above, due to its auxiliary function, the 5V DC standby signal is not considered as an "output" of the single output AC-DC power supply 230, herein.

Figure 3:
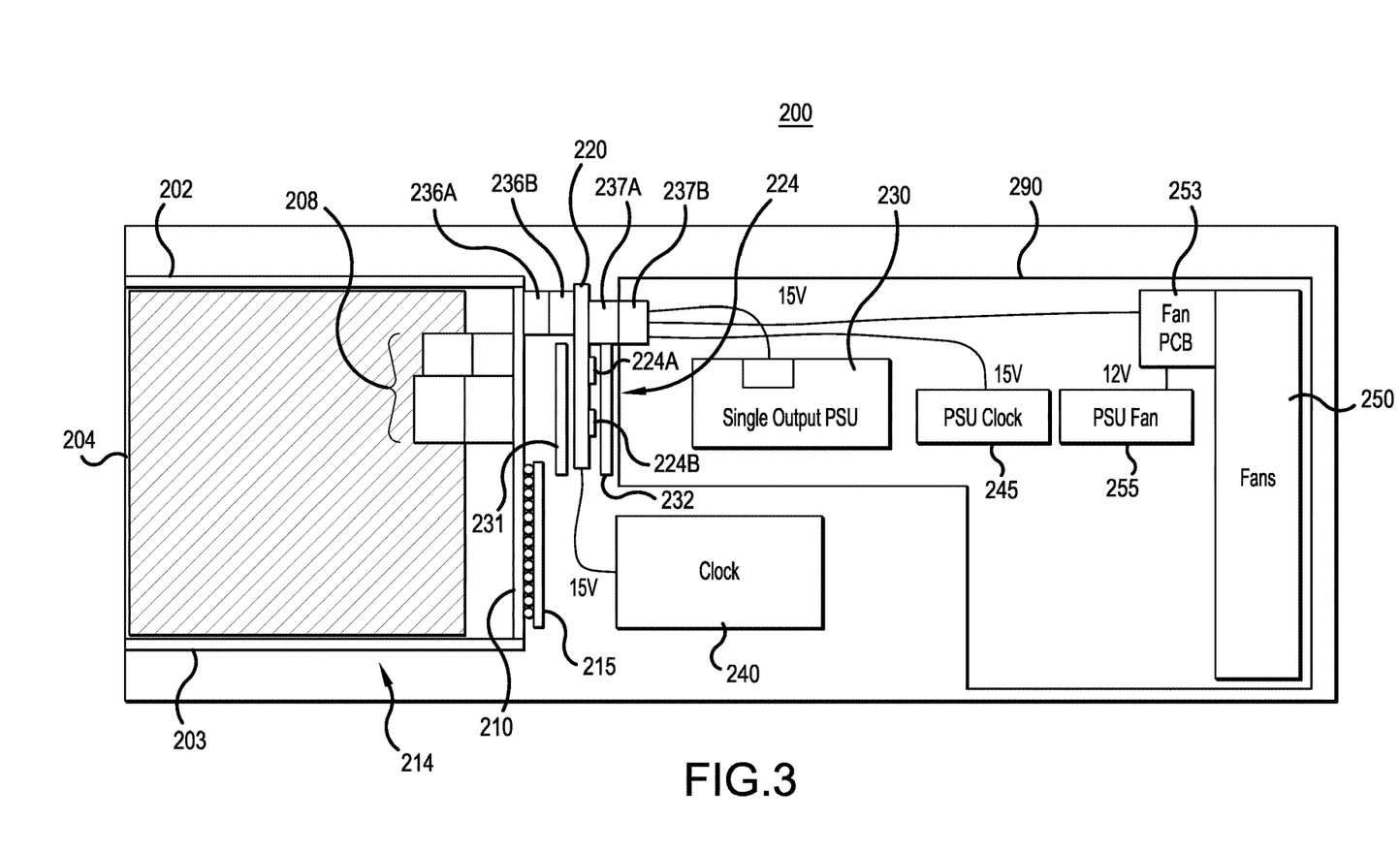
FIG. 3 is a simplified cross-sectional view of an instrumentation chassis, including multiple DC-DC power supplies, located on a power board behind a backplane PCB, that provide DC voltages to slots, respectively, according to a representative embodiment.

In an embodiment, the power board 220 is located on a back side of the backplane PCB 210, opposite a front side of the backplane PCB 210 on which the slots 211, 212, 213, 214, . . . 218 are located. Thus, the backplane PCB 210 is positioned between the DC-DC switching regulator units 221, 222, 223, 224, . . . 228, arranged on the power board 220, and the slots 211, 212, 213, 214, . . . 218, as shown in FIG. 3, for example, discussed below. This enhances noise isolation between the switching regulator units 221, 222, 223, 224, . . . 228 and peripheral modules that are inserted in corresponding slots 211, 212, 213, 214, . . . 218 on the front side of the backplane PCB 210. In addition, any of the DC-DC switching regulator units 221, 222, 223, 224, . . . 228 that are not in use may be disabled, further minimizing switching noise and power dissipation. This includes, for example, any of the DC-DC switching regulator units 221, 222, 223, 224, . . . 228 corresponding to empty slots, or corresponding to slots having inserted modules that are powered down.

The chassis 200 further includes processing unit (or power manager) 280 connected to each of the DC-DC switching regulator units 221, 222, 223, 224, . . . 228, in order to manage operations of the DC-DC switching regulator units 221, 222, 223, 224, . . . 228. For example, the processing unit 280 may connect to dedicated frequency control lines (not shown) to DC-DC switching regulators, discussed below, in each of the DC-DC switching regulator units 221, 222, 223, 224, . . . 228, respectively, in order to control switching frequency and relative phases (phase relationships) of the DC-DC switching regulators using frequency control signals. Generally, the switching frequency is the rate at which a DC-DC switching regulator completes a cycle (through high and low levels, for example). Duty cycle of a DC-DC switching regulator relates to how long within the cycle the DC-DC switching regulator is at the high level versus the low level, where the longer the DC-DC switching regulator remains in the high level within the cycle, as compared to the low level, the higher the duty cycle and thus the higher the voltage output level, for example. The processing unit 280 may receive commands from the system module inserted in the system slot 211, for example. In various embodiments, the processing unit 280 may be included in the system module, or may be included separately in the chassis 200 or another module, without departing from the scope of the present teachings.

Because there are separate DC-DC switching regulator units 221, 222, 223, 224, . . . 228 for the slots 211, 212, 213, 214, . . . 218, the corresponding switching frequencies and relative phases may be controlled independently. This differs from a conventional chassis, such as chassis 100 in FIG. 1, with a multi-output AC-DC power supply 130, which does not have the ability to adjust the switching frequency and relative phase of the DC outputs at all to the slots 111, 112, 113, 114, . . . 118. The processing unit 280 may also receive feedback from the DC-DC switching regulators of the DC-DC switching regulator units 221, 222, 223, 224, . . . 228, via dedicated feedback lines or via the frequency control lines, enabling a closed loop control system.

Operations managed by the processing unit 280 may include measuring power consumption from the dedicated rails 261, 262, 263, 264, . . . 268, respectively, which connect the AC-DC power supply 230 to the DC-DC switching regulator units 221, 222, 223, 224, . . . 228, to determine corresponding load requirements. Also, as discussed above, the processing unit 280 may adjust at least one of switching frequency and relative phase of the DC-DC switching regulator(s) (e.g., DC-DC switching regulators 221A-221C, 222A-222B, 223A-223B, 224A-224B, . . . 228A-228B) in one or more of the DC-DC switching regulator units 221, 222, 223, 224, . . . 228. For example, the relative phases of the clocks driving the DC-DC switching regulators (or stated more simply, the relative phases of the DC-DC switching regulators) in each of the DC-DC switching regulator units 221, 222, 223, 224, . . . 228 may be synchronized. Also, the relative phases of the DC-DC switching regulators may be adjusted or set to predetermined phase angles, e.g., such as a 180 degree phase angle, with respect to one another. The relative phases may be synchronized and/or adjusted between switching regulators within the same DC-DC switching regulator units 221, 222, 223, 224, . . . 228, or between switching regulators in other DC-DC switching regulator units 221, 222, 223, 224, . . . 228. Adjusting frequency and/or relative phase minimizes noise, based on corresponding load requirements.

Other functions performed by the processing unit 280 include dithering switching frequencies of the DC-DC switching regulators to reduce noise peaks, and synchronizing phases of the DC-DC switching regulators to minimize noise peaks, which are enabled by the ability to control switch frequency and relative phases of all the DC-DC switching regulators or regulator units independently. The processing unit 280 may also be programmed to disable DC-DC switching regulator units 221, 222, 223, 224, . . . 228 that are not required (e.g., corresponding to unused or empty slots), and to provide software application programming interfaces (APIs) for one or more modules inserted in the slots 211, 212, 213, 214, . . . 218 to implement frequency changes (e.g., to move the switching frequency away from the frequency range that the module is currently measuring).

The processing unit 280 may be implemented by one or more computer processors, field-programmable gate arrays (FPGAs), application specific integrated circuits (ASICs), or combinations thereof, using software, firmware, hard-wired logic circuits, or combinations thereof. A computer processor, in particular, may be constructed of any combination of hardware, firmware or software architectures, and may include its own memory (e.g., nonvolatile memory) for storing executable software/firmware executable code that allows it to perform the various functions. In an embodiment, the computer processor may comprise a central processing unit (CPU), for example, executing an operating system.

The processing unit 280 may be in communication with a memory (not shown) that stores information regarding the chassis 200 and the various DC-DC switching regulator units 221, 222, 223, 224, . . . 228, for example. The memory may also store information and processing results (e.g., regarding frequency and relative phase) for various configurations of the chassis 200, enabling the information to be recalled when the configurations are repeated. The memory may be implemented by any number, type and combination of random access memory (RAM) and read-only memory (ROM), for example, and may store various types of information, such as computer programs and software algorithms executable by the processing unit 280. The various types of ROM and RAM may include any number, type and combination of computer readable storage media, such as a disk drive, disk storage, an electrically programmable read-only memory (EPROM), an electrically erasable and programmable read only memory (EEPROM), a CD, a DVD, a universal serial bus (USB) drive, and the like, which are tangible and non-transitory storage media (e.g., as compared to transitory propagating signals).

The chassis 200 also includes a clock 240 powered by a clock power supply unit (PSU) 245, and one or more fans 250 powered by a fan PSU 255. The clock PSU 245 may be an AC-DC power supply configured to provide an isolated output of 15V DC to the clock 240, and the fan PSU 255 may be a separate AC-DC power supply configured to provide an isolated output of 12V to the fans 250, for example. In the configuration depicted in FIG. 2, the clock PSU 245 is a 100 W 15V PSU and the fan PSU 255 is a 60 W 12V PSU.

FIG. 3 is a simplified cross-sectional view of a instrumentation chassis, including multiple DC-DC power supplies, located on a power board behind a backplane PCB, that provide DC voltages to slots, respectively, according to a representative embodiment.

Referring to FIG. 3, the instrumentation chassis 200 includes the backplane PCB 210 and the power board 220 mounted behind the backplane PCB 210. The cross-section is provided at the slot 214 of the chassis 200, for purposes of illustration, where a module 204 is shown inserted within the slot 214. As discussed above, the slot 214 is a peripheral slot and thus the module 204 is a peripheral module. The module 204 may be slid into place along guide rails 202 and 203 of the slot 214, making contact with illustrative connectors 208 in order to connect with the backplane PCB 210, as well as the switching fabric 215 included on the backplane PCB 210. The switching fabric 215 may control connections of the module 204 to selectively enable communications with other modules in one or more of the other slots 211, 212, 213, . . . 218, and/or to external devices. The requirements for the module 204, the connectors 208, the backplane PCB 210, and the switching fabric 215 may be provided PXIe standards, for example, although other standards governing modular chassis, such as PCI, PCIe and PXI, may be included, in addition to or in place of the PXIe standards, without departing from the scope of the present teachings, as would be apparent to one skilled in the art. For example, a chassis may include two rows of slots (not shown), where a top row of slots is configured for PXIe connections and a bottom row slots is configured for PXI connections. Further, it is understood that description herein with regard to the chassis 200, including the slot 214 and the module 204, is applicable to the other slots 211, 212, 213, . . . 218 and corresponding modules.

The DC-DC switching regulator units 221-228 are mounted on the power board 220, as indicated by the DC-DC switching regulator unit 224, which includes the DC-DC switching regulators 224A and 224B. As shown, power board 220 is mounted to the back side of the backplane PCB 210, e.g., via mezzanine connectors 236A and 236B, opposite a front side of the backplane PCB 210 on which the slots 211, 212, 213, 214, . . . 218 are located. Further, the DC-DC switching regulators 224A and 224B are mounted to the back side of the power board 220, opposite a front side of the power board 220, which faces the backplane PCB 210. Thus, both the backplane PCB 210 and the power board 220 are positioned between the slots 211, 212, 213, 214, . . . 218 (and any modules inserted therein, such as illustrative peripheral module 204) and the DC-DC switching regulator unit 224. This arrangement helps to provide isolation between the noisy DC-DC switching regulators of the DC-DC switching regulator units 221, 222, 223, . . . 228 and the modules in the slots 211, 212, 213, 214, . . . 218, reducing noise coupling and other the adverse affects of noise generated by the DC-DC switching regulators. In addition, the power board 220 is spaced apart from the backplane PCB 210, creating more distance between the DC-DC switching regulator units 221, 222, 223, . . . 228 and the slots 211, 212, 213, 214, . . . 218.

In the depicted embodiment, the chassis 200 also includes a first metal shield 231 and a second metal shield 232 positioned on both sides of the power board 220 to further contain noise produced by the DC-DC switching regulator units 221, 222, 223, 224, . . . 228, and to further reduce interference or otherwise insulate the DC-DC switching regulator units 221, 222, 223, 224, . . . 228 from other components within the chassis 200. The first metal shield 231 is positioned between the power board 220 and the backplane PCB 210, and the second metal shield 232 is positioned between the power board 220 and the power supply units, including the single output AC-DC power supply 230, the clock PSU 245 and the fan PSU 255. The first and second metal shields 231 and 232 may be formed of steel or mu-metal, for example, although other (electric and/or magnetic field) insulating materials may be included without departing from the scope of the present teachings.

In addition, FIG. 3 shows the clock 240 powered by the clock PSU 245, and the fans 250 powered by a fan PSU 255. In the depicted embodiment, the clock 240 is connected to the power board 220, and receives power from the clock PSU 245 through the power board 220, to facilitate easy removal of power supply shuttle 290 for quick servicing and replacement. The fans 250 are controlled through a fan PCB 253. Each of the single output AC-DC power supply 230, the clock PSU 245 and the fan PCB 253 is connected to the backplane PCB 210, e.g., blind mate connectors 237A and 237B. The fans 250 may be controlled, for example, by a system module inserted in the system slot 211, based on detected temperature at the system module, as well as at any peripheral modules that may be present. Consistent with FIG. 2, FIG. 3 shows the single output AC-DC power supply 230 configured to provide an isolated output of 15V DC to the power board 220, the clock PSU 245 configured to provide an isolated output of 15V DC to the clock 240, and the fan PSU 255 to provide an isolated output of 12V to the fans 250, for example.

Notably, each of the AC-DC power supply 230, the clock PSU 245 and the fan PSU 255 are positioned behind the backplane PCB 210. This places the backplane PCB 210, as well as the power board 220 and the first and second metal shields 231 and 232, between each of the AC-DC power supply 230, the clock PSU 245 and the fan PSU 255 and the slots 211, 212, 213, 214, . . . 218 (and any modules inserted therein), thus reducing interference otherwise caused by operation of the AC-DC power supply 230, the clock PSU 245 and the fan PSU 255.

Thus, according to various embodiments, a modular instrumentation chassis, operable in accordance with at least one modular instrumentation standard, includes a backplane PCB; multiple slots located on the backplane PCB and configured to receive multiple insertable modules, respectively; an AC-DC power supply configured to generate an isolated DC output voltage; and multiple DC-DC switching regulator units corresponding to the multiple of slots, respectively, each DC-DC switching regulator unit separately receiving the isolated DC output voltage from the AC-DC power supply. Each DC-DC switching regulator unit includes at least one DC-DC switching regulator configured to convert the received isolated DC output voltage to at least one different DC voltage, respectively, available to the slot of the multiple slots corresponding to the DC-DC switching regulator unit. A switching frequency of the at least one DC-DC switching regulator in each DC-DC switching regulator unit is separately adjustable to provide the at least one different DC voltage. The switching frequency, as well as relative phases between frequencies of DC-DC switching regulators, may be controlled by a processing unit.

While the disclosure references exemplary embodiments, it will be apparent to those skilled in the art that various changes and modifications may be made without departing from the spirit and scope of the present teachings. Therefore, it should be understood that the above embodiments are not limiting, but illustrative.

What is claimed:

1. An instrumentation chassis, comprising:
a backplane printed circuit board (PCB);
a plurality of slots located on a front side of the backplane PCB and configured to receive a plurality of insertable modules, respectively;
an AC to DC power supply physically located behind a back side of the backplane PCB and configured to generate an isolated DC output voltage;
a power board connected to and spaced apart from the back side of the backplane PCB and physically located between the AC to DC power supply and the backplane PCB; and
a plurality of DC to DC switching regulator units arranged on a back side of the power board corresponding to the plurality of slots, respectively, and separately receiving the isolated DC output voltage from the AC to DC power supply via corresponding power rails, each DC to DC switching regulator unit comprising at least one DC to DC switching regulator configured to convert the received isolated DC output voltage to at least one different DC voltage, respectively, available to the slot of the plurality of slots corresponding to the DC to DC switching regulator unit,
wherein switching frequency of the at least one DC to DC switching regulator in each DC to DC switching regulator unit is separately adjustable, and
wherein the plurality of DC to DC switching regulator units connected to and spaced apart from the back side of the power board enhances noise isolation between the plurality of DC to DC switching regulator units and one or more modules inserted in corresponding slots.

2. The chassis of claim 1, wherein the processing unit is programmed disable unused DC to DC switching units corresponding to unused or empty slots, minimizing switching noise and power dissipation, while the AC to DC power supply remains on.

3. The chassis of claim 1, wherein the AC to DC power supply is further configured to generate a low power DC standby voltage directly available to the plurality of slots.

4. The chassis of claim 1, wherein the at least one DC to DC switching regulator of at least one of the DC to DC switching regulator units comprises:
a first DC to DC switching regulator configured to receive the isolated DC output voltage directly from the AC to DC power supply and to output a first DC voltage, the first DC voltage being provided to a module inserted in the slot of the plurality of slots corresponding to the at least one of the DC to DC switching regulator units; and
a second DC to DC switching regulator configured to receive the first DC voltage from the first DC to DC switching regulator, or to receive the isolated DC output voltage directly from the AC to DC power supply, and to output a second DC voltage, different from the first DC voltage, to the inserted module.

5. The chassis of claim 4, wherein a switching frequency of the first DC to DC switching regulator is separately adjustable from a switching frequency of the second DC to DC switching regulator.

6. The chassis of claim 4, wherein the isolated DC output voltage is approximately 15V, the first DC voltage is approximately 12V, and the second DC voltage is approximately 3.3V.

7. The chassis of claim 2, further comprising:
a processing unit connected to each of the DC to DC switching regulators in the plurality of DC to DC switching regulator units, respectively, via dedicated frequency control lines, the processing unit providing frequency control signals to adjust the switching frequencies of the DC to DC switching regulators, respectively.

8. The chassis of claim 2, wherein the frequency control signals provided by the processing unit further adjust phase relationship between at least two of the DC to DC switching regulators.

9. The chassis of claim 2, wherein the processing unit further manages operations of the plurality of DC to DC switching regulator units, including measuring power consumption from the power rails connecting the AC to DC power supply to the plurality of DC to DC switching regulator units, respectively, to determine corresponding load requirements of the plurality of DC to DC switching regulator units.

10. The chassis of claim 8, wherein adjusting at least one of the switching frequencies and the phase relationship of the DC to DC switching regulators in one or more of DC to DC switching regulator units minimizes noise.

11. The chassis of claim 2, wherein the processing unit further manages operations of the plurality of DC to DC switching regulator units, including dithering the switching frequencies of the DC to DC switching regulators in one or more of DC to DC switching regulator units to reduce corresponding noise peaks.

12. The chassis of claim 8, wherein adjusting the phase relationship between the at least two of the DC to DC switching regulators comprises synchronizing phases of the at least two of the DC to DC switching regulators to minimize corresponding noise peaks.

13. The chassis of claim 2, wherein the processing unit further manages operations of the plurality of DC to DC switching regulator units, including providing software application programming interfaces (APIs) for one or more modules inserted in corresponding slots of the plurality of slots to enable frequency changes.

14. The chassis of claim 2, wherein the processing unit comprises at least one of a field programmable gate array (FPGA), an application specific integrated circuit (ASIC), and a computer processor.

15. The chassis of claim 1, further comprising:
a first metal shield located between the power board and the backplane PCB, the first metal shield further enhancing noise isolation between the plurality of DC to DC switching regulator units and the one or more modules inserted in the corresponding slots; and
a second metal shield located between the power board and the AC to DC power supply, the second metal shield further enhancing noise isolation between the plurality of DC to DC switching regulator units and the AC to DC power supply.

16. The chassis of claim 1, further comprising:
a clock and a clock AC to DC power supply unit physically located behind the back side of the power board for providing an isolated DC output voltage to the clock; and
at least one fan and a fan AC to DC power supply unit physically located behind the back side of the power board for providing an isolated DC output voltage to the at least one fan.

17. A peripheral component interconnect express (PCIe) eXtensions for instrumentation (PXIe) chassis, comprising:
a backplane printed circuit board (PCB);
a plurality of slots located on a front side of the backplane PCB, and configured to receive a plurality of insertable PXIe peripheral modules, respectively;
a power board connected to and spaced apart from a back side of the backplane PCB, opposite the front side;
an AC to DC power supply physically located adjacent a back side of the power board, such that the power board is positioned between the backplane PCB and the AC to DC power supply, the AC to DC power supply being configured to generate a single DC output voltage and a low power DC standby voltage; and
a plurality of DC to DC switching regulator units located on the back side of the power board, and corresponding to the plurality of slots located on the front side of the backplane, respectively, the plurality of DC to DC switching regulator units receiving the DC output voltage from the AC to DC power supply via corresponding power rails, respectively,
wherein each DC to DC switching regulator unit comprises DC to DC switching regulators configured to convert the received DC output voltage to different DC voltages that are provided to the slot corresponding to the DC to DC switching regulator unit, and
wherein the low power DC standby voltage is provided directly from the AC to DC power supply to the plurality of slots, respectively.

18. The PXIe chassis of claim 17, further comprising:
a processing unit connected to the DC to DC switching regulators via dedicated frequency control lines, and programmed to provide frequency control signals to adjust the switching frequencies and phase relationships of the DC to DC voltage regulators, respectively.

* * * * *